(12) United States Patent
Holzem et al.

(10) Patent No.: US 9,650,164 B2
(45) Date of Patent: May 16, 2017

(54) PACKAGING MACHINE WITH SEALING DEVICE

(71) Applicant: Multivac Sepp Haggenmüller GmbH & Co. KG, Wolfertschwenden (DE)

(72) Inventors: Dieter Holzem, Erolzheim (DE); Christian Geble, Oy/Mittelberg (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 712 days.

(21) Appl. No.: 13/852,860

(22) Filed: Mar. 28, 2013

(65) Prior Publication Data

US 2013/0255201 A1 Oct. 3, 2013

(30) Foreign Application Priority Data

Mar. 30, 2012 (DE) .................. 10 2012 006 696

(51) Int. Cl.
*B65B 7/00* (2006.01)
*B65B 31/02* (2006.01)
(Continued)

(52) U.S. Cl.
CPC ............ *B65B 7/00* (2013.01); *B65B 7/164* (2013.01); *B65B 31/028* (2013.01); *B29C 65/02* (2013.01); *B29C 66/112* (2013.01); *B29C 66/131* (2013.01); *B29C 66/24244* (2013.01); *B29C 66/53461* (2013.01); *B29C 66/81431* (2013.01); *B29C 66/8242* (2013.01); *B29C 66/83221* (2013.01); *B29C 66/849* (2013.01); *B29C 66/8432* (2013.01); *B29C 66/914* (2013.01); *B29C 66/929* (2013.01); *B29C 66/9241* (2013.01); *B29C 66/944* (2013.01); *B29L 2031/7162* (2013.01); *B65B 47/00* (2013.01); *B65B 61/065* (2013.01); *B65B 61/08* (2013.01); *B65B 2051/105* (2013.01)

(58) Field of Classification Search
CPC ........ B29C 66/83221; B29C 66/92451; B29C 66/9241; B29C 66/53461; B29C 66/8432; B29C 66/8322; B29C 66/849; B29C 66/24243; B29C 66/24244; B29C 66/843; B29C 65/76; B65B 7/164; B65B 61/065; B65B 2051/105; B65B 1/18; B65B 1/14; B65B 61/18; B65B 7/2878; B65D 75/5855
USPC ........ 53/75, 296, 329, 476, 557, 511, 375.9, 53/374.8, 329.3, 329.5; 156/69
See application file for complete search history.

(56) References Cited

U.S. PATENT DOCUMENTS 3,298,158 A * 1/1967 Schmidt ................ B65B 31/028
426/396
3,583,125 A * 6/1971 Vermeulen .............. B29C 65/18
53/133.4
(Continued)

FOREIGN PATENT DOCUMENTS

DE 2852727 A1 7/1980
DE 102006040807 A1 3/2008
(Continued)

*Primary Examiner* — Gloria R Weeks
(74) *Attorney, Agent, or Firm* — Husch Blackwell LLP

(57) ABSTRACT

The invention relates to a packaging machine including a sealing device, said sealing device comprising at least a first and an individually controllable second sealing tool for producing a first and a second seal uniting a lower web with a top web.

9 Claims, 5 Drawing Sheets

(51) Int. Cl.
    *B65B 7/16*         (2006.01)
    *B65B 47/00*         (2006.01)
    *B65B 61/06*         (2006.01)
    *B65B 61/08*         (2006.01)
    *B65B 51/10*         (2006.01)
    *B29L 31/00*         (2006.01)
    *B29C 65/00*         (2006.01)
    *B29C 65/02*         (2006.01)

(56) References Cited

U.S. PATENT DOCUMENTS

| | | | | |
|---|---|---|---|---|
| 4,201,030 | A * | 5/1980 | Mahaffy | B65B 31/021 426/129 |
| 4,424,659 | A * | 1/1984 | Perigo | B65D 77/2024 426/129 |
| 4,707,213 | A * | 11/1987 | Mohr | B29C 65/3656 156/380.2 |
| 4,961,513 | A * | 10/1990 | Gossedge | B29C 65/18 156/69 |
| 5,056,296 | A * | 10/1991 | Ross | B29C 65/7847 156/499 |
| 5,155,974 | A * | 10/1992 | Garwood | B65B 7/168 426/129 |
| 5,226,531 | A * | 7/1993 | Garwood | B65B 31/021 206/213.1 |
| 5,447,736 | A * | 9/1995 | Gorlich | B65B 7/168 426/316 |
| 5,534,282 | A * | 7/1996 | Garwood | B65D 25/102 426/396 |
| 5,718,101 | A * | 2/1998 | Noel | B65B 7/164 53/300 |
| 5,779,050 | A * | 7/1998 | Kocher | B32B 27/08 206/497 |
| 6,044,622 | A * | 4/2000 | Brady | B65B 61/18 426/129 |
| 6,050,055 | A * | 4/2000 | Calvert | B29C 65/18 53/300 |
| 6,305,149 | B1 * | 10/2001 | Gorlich | B26D 7/10 53/329.5 |
| 6,351,928 | B2 * | 3/2002 | Torre | 53/297 |
| 6,488,972 | B1 * | 12/2002 | Cerani | B65B 11/50 206/497 |
| 6,834,476 | B2 * | 12/2004 | Konishi | B65B 7/164 53/329.4 |
| 7,269,932 | B2 * | 9/2007 | Konishi | B65B 7/164 53/329.4 |
| 7,600,358 | B2 * | 10/2009 | Natterer | B65B 7/164 426/396 |
| 7,665,281 | B2 * | 2/2010 | Send | B29C 65/58 53/329.2 |
| 8,381,497 | B2 * | 2/2013 | Scheibel | B65B 9/02 53/170 |
| 2003/0131568 | A1 * | 7/2003 | Rossi | B65B 31/043 53/510 |
| 2003/0196412 | A1 * | 10/2003 | Foulke, Jr. | B65B 31/028 53/432 |
| 2005/0247593 | A1 * | 11/2005 | Salvoni | B65D 81/2038 206/557 |
| 2005/0257501 | A1 * | 11/2005 | Natterer | B65B 7/164 53/432 |
| 2006/0048480 | A1 * | 3/2006 | Konishi | B65B 7/164 53/329.3 |
| 2006/0123739 | A1 * | 6/2006 | Konishi | B65B 7/164 53/329.3 |
| 2010/0287881 | A1 * | 11/2010 | Ehrmann | B65B 7/164 53/170 |
| 2010/0287893 | A1 * | 11/2010 | Ehrmann | B65B 7/01 53/487 |
| 2011/0167762 | A1 * | 7/2011 | Holzem | B29C 65/18 53/329 |
| 2012/0151875 | A1 * | 6/2012 | Capriotti | B30B 1/42 53/285 |
| 2012/0324835 | A1 * | 12/2012 | Ickert | B65B 7/164 53/476 |
| 2013/0055688 | A1 * | 3/2013 | Jokele | B29C 65/18 53/476 |
| 2013/0263559 | A1 * | 10/2013 | Scolaro | B65B 7/2878 53/485 |

FOREIGN PATENT DOCUMENTS

| | | |
|---|---|---|
| DE | 102007034735 A1 | 1/2009 |
| DE | 102011110407 B3 | 1/2013 |
| EP | 2380810 A2 | 10/2011 |
| WO | 2012080932 A1 | 6/2012 |

* cited by examiner

PACKAGING MACHINE WITH SEALING DEVICE

CROSS-REFERENCE TO RELATED APPLICATIONS

This Application claims priority to German Application Number 102012006696.1 filed Mar. 30, 2012, to Dieter Holzem and Christian Geble entitled "Packaging Machine With Sealing Device," currently pending, the entire disclosure of which is incorporated herein by reference.

FIELD OF THE INVENTION

The invention relates to a packaging machine.

BACKGROUND OF THE INVENTION

Machines comprising a sealing station so as to produce packages after the fashion of FIG. 5 are known from the applicant. The requirements to be fulfilled by such a package comprise, on the one hand, a circumferentially extending sealed seam for hermetically sealing the interior of the package, which contains a foodstuff under vacuum or in a modified atmosphere, by sealing a cover film onto a shaped bottom film/foil. This circumferentially extending sealed seam includes a cover film that can be detached from the bottom film for the purpose of opening the package. On the other hand, an additional area outside this sealed seam is sealed in the form of a planar seal so as to provide a stable area for suspending the package. This planar seal is sealed inseparably. The planar seal can be produced by applying a pressure that is higher or lower than that used for the sealed seam. To this end, a mechanical adjustment is provided, which has to be adapted to the various combinations of films. The increased or reduced sealing pressure or a change in the sealing pressure of the planar seal must not affect the sealing pressure of the sealed seam. The mechanical adjustment is carried out by changing the amount to which the sealing surface of the sealing plate of the planar seal projects beyond or falls short of the sealed seam and is very complicated and difficult to set. The amount to which the sealing surface projects is adjusted, for example, by means of packing plates of different thicknesses.

SUMMARY OF THE INVENTION

It is the object of the present invention to provide a packaging machine with a sealing device, which improves the possibilities of adjusting the sealing parameters such as sealing force, sealing temperature and/or sealing time for various seals within a sealing device and a package, respectively, the term "seal" including hereinbelow also the above-mentioned sealed seams.

The packaging machine according to the present invention includes a sealing device, said sealing device comprising at least a first and a second sealing tool for producing a first and a second seal uniting a lower web with a top web. In this packaging machine, actuators can be provided for the sealing tools, by means of which the sealing forces of the sealing tools can be adjusted individually. This is advantageous insofar as the sealing forces for different kinds of seals used for satisfying different demands on a single package can be adjusted independently of one another.

The actuators may be provided in the form of diaphragms, pneumatic cylinders or motor drives so as to provide individual control and so as to allow sealing forces of up to 12 kN and sealing pressures of up to 3 N/mm².

The packaging machine can include a controller by means of which the sealing force, the sealing temperature and/or the sealing time for the first and second seals can be adjusted separately, so as to be able to provide an automatic changeover of different machine settings for different packages.

According to one embodiment, the first sealing tool is provided for producing a sealed seam which extends circumferentially around a product and the second sealing tool is provided for producing a planar seal. By providing different sealing tools, which each have actuators of their own, a change of the respective seal can be accomplished rapidly and easily and without the other seal being affected.

According to another embodiment, the sealed seam of the first sealing tool and the seal of the second tool extend adjacent to one another and do not overlap each other, since only a non-overlapping arrangement of the sealing surfaces can exclude that one seal affects the other.

The first and second seals can be produced simultaneously so as to avoid any unnecessary extension of the process time required for executing the sealing process for the package.

Other and further objects of the invention, together with the features of novelty appurtenant thereto, will appear in the course of the following description.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

Identical components are provided with identical reference numerals throughout the figures.

DETAILED DESCRIPTION OF THE INVENTION

Figure 1:
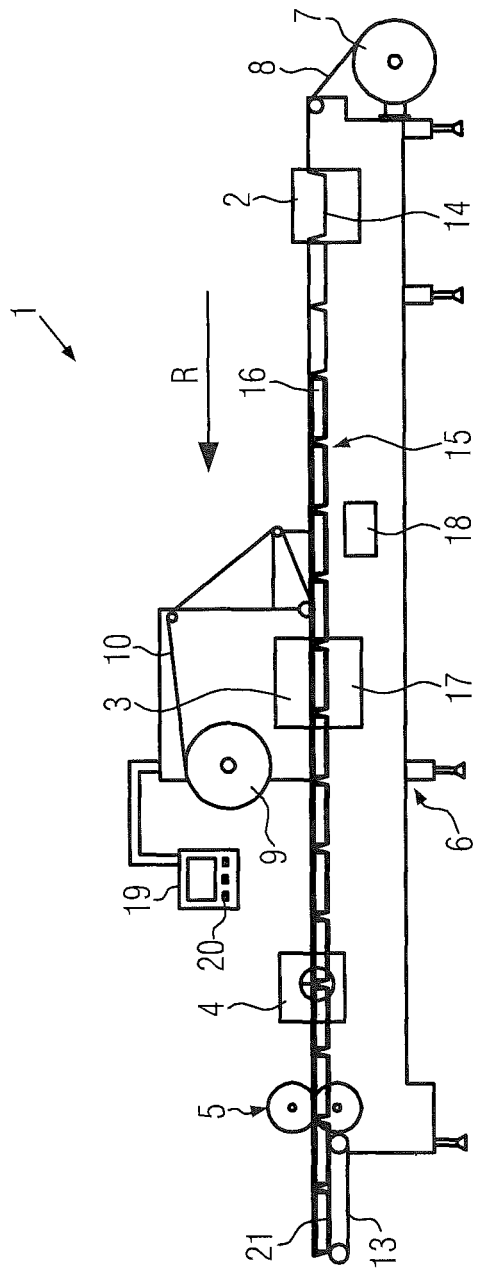
FIG. 1 a schematic side view of a thermoform packaging machine according to one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a schematic view of a thermoform packaging machine 1 according to one embodiment of the present invention. As illustrated, thermoform packaging machine 1 comprises a forming station 2, a sealing station 3 (also referred to as sealing device), a transverse cutting device 4 and a longitudinal cutting device 5, which are arranged in this order in a working direction R on a machine frame 6. On the input side a supply roll 7 is provided on the machine frame 6, from which a film 8 (also referred to as lower web) is unwound. In the area of the sealing station 3, a material storage unit 9 is provided, from which a cover film 10 (also referred to as top web) is unwound. On the output side, a discharge device 13 in the form of a conveyor belt is provided at the packaging machine, with which finished, singulated packages 21 are transported away. Furthermore, the thermoform packaging machine 1 comprises a feeding device which is not shown, said feeding device gripping the film 8 and advancing it in the working direction R during each main work cycle. The feeding device can be realized, for example, by transport chains arranged on either side.

In the embodiment shown, the forming station 2 is realized as a thermoforming station, which is used for forming molded troughs and in which troughs 14 are formed in the film 8 by thermoforming. The forming station 2 can be configured such that in the direction perpendicular to the working direction R several troughs are formed side by side. Downstream of the forming station 2, when seen in the working direction R, an infeed line 15 is provided, along which the troughs 14 formed in the film 8 are filled with the product 16.

The sealing station 3 is provided with a closable chamber 17 in which the atmosphere in the troughs 14 can be substituted, prior to sealing, by an exchange gas or by a gas mixture, for example, by gas flushing.

The transverse cutting device 4 can be configured as a punch separating the film 8 and the cover film 10 in a direction transversely to the working direction R between neighbouring troughs 14. In so doing, the transverse cutting device 4 works such that the film 8 is not cut across the whole width of the film, but remains uncut in at least an edge area. This allows controlled further transport by the feeding device. In the embodiment shown, the longitudinal cutting device 5 is configured as a blade arrangement by means of which the film 8 and the cover film 10 are cut between neighbouring troughs 14 and at the lateral edge of the film 8, so that, downstream of the longitudinal cutting device 5, singulated packages are obtained.

The thermoform packaging machine 1 is additionally provided with a controller 18. It is used for controlling and monitoring the processes taking place in the thermoform packaging machine 1. A display device 19 with operating controls 20 serves to make the sequences of process steps in the thermoform packaging machine 1 visible to an operator and to influence them by the operator.

The general mode of operation of the thermoform packaging machine 1 will be described briefly in the following:

The film 8 is unwound from the supply roll 7 and conveyed into the forming station 2 by the feeding device. In the forming station 2, troughs 14 are formed in the film 8 by thermoforming. Together with the material of the film 8 surrounding them, the troughs 14 are advanced, in a main work cycle, to the infeed line 15 where they are filled with the product 16.

Subsequently, the filled troughs 14 are, together with the area of the film 8 surrounding them, advanced by the feeding device into the sealing station 3 during the main work cycle. After having been sealed onto the film 8, the cover film 10 is advanced when the feed motion of the film 8 takes place. In the course of this process, the cover film 10 is unwound from the material storage unit 9. By sealing the cover film 10 onto the troughs 14, closed packages 21 are obtained, which are singulated in the subsequent cutting stations 4 and 5 and removed from the thermoform packaging machine 1 by means of the discharge device 13.

Figure 2:
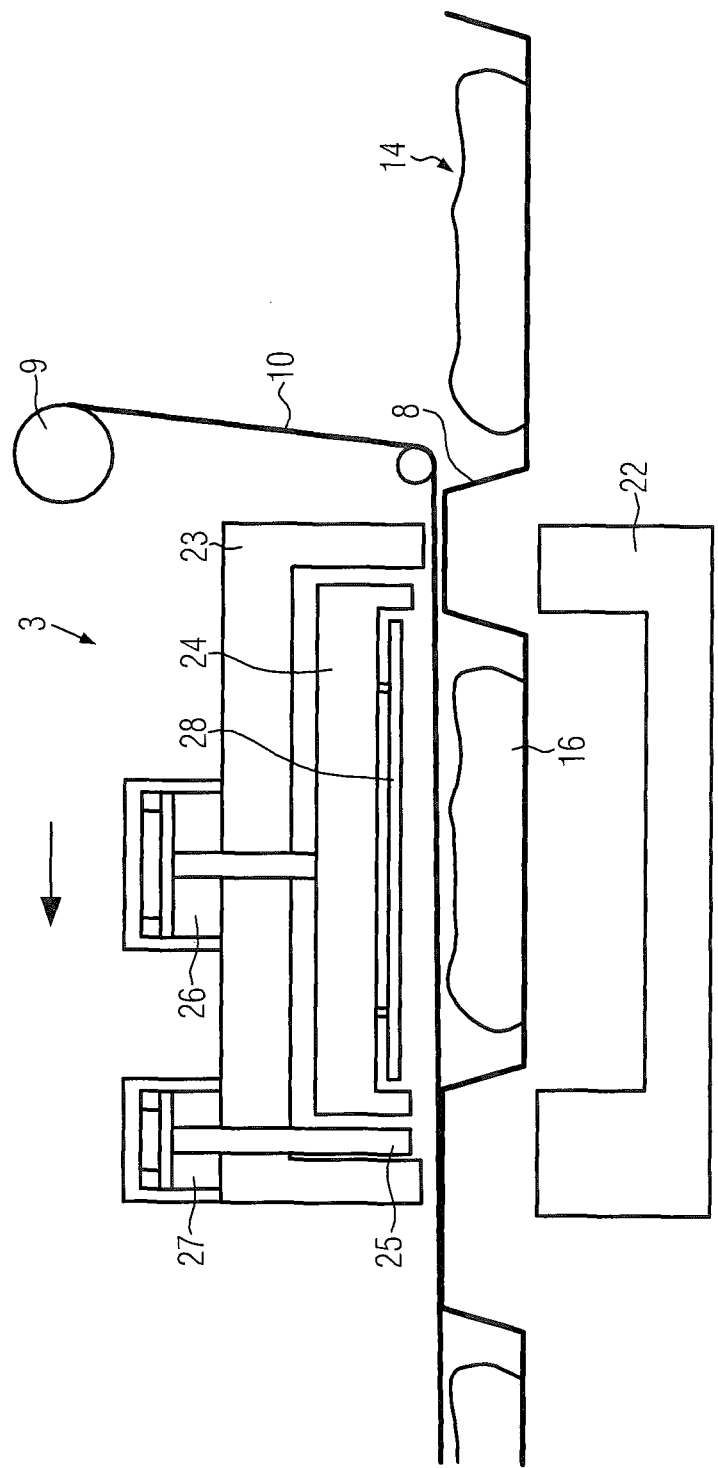
FIG. 2 a schematic sectional side view of the sealing station in the open condition according to one embodiment of the present invention.

FIG. 2 shows a schematic sectional view of the sealing station 3 comprising a sealing tool lower part 22, a sealing tool upper part 23, a first sealing plate 24 and a second sealing plate 25. The first sealing plate 24 can be adapted to be moved relative to the sealing tool upper part 23 via a first actuator 26 and the second sealing plate 25 can be adapted to be moved orthogonally to the film 8 via a second actuator 27. Both actuators 26, 27 and both sealing plates 24, 25, respectively, are operable separately and the actuators 26, 27 may be configured as diaphragms. The first sealing plate 24 can include on the lower surface thereof a product protection plate 28 so that the heat of the sealing plate 24 will only act on the surface to be sealed but not on the product 16. At this open position of the sealing station 3, the sealing station has inserted therein a not yet sealed trough 14, formed of the film 8 and containing the product 16, and a cover film 10.

Figure 3:
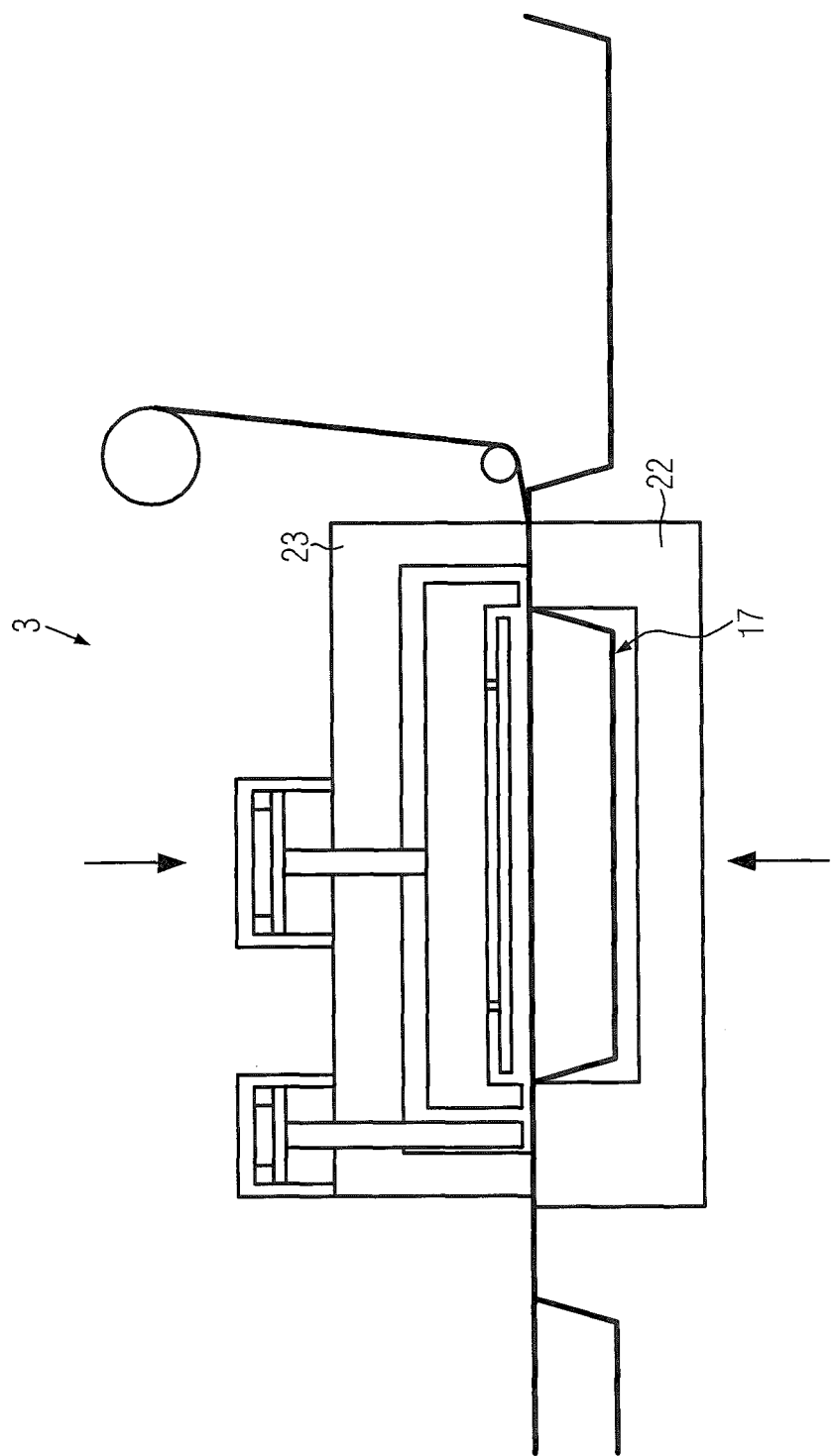
FIG. 3 a schematic sectional side view of the sealing station in the closed condition according to one embodiment of the present invention.

FIG. 3 shows the sealing station 3 at a closed position, at which the sealing tool lower part 22 defines together with the sealing tool upper part 23 the closed chamber 17, so that the chamber 17 and thus also the interior of the trough 14 can be evacuated and/or subjected to gas flushing.

Figure 4:
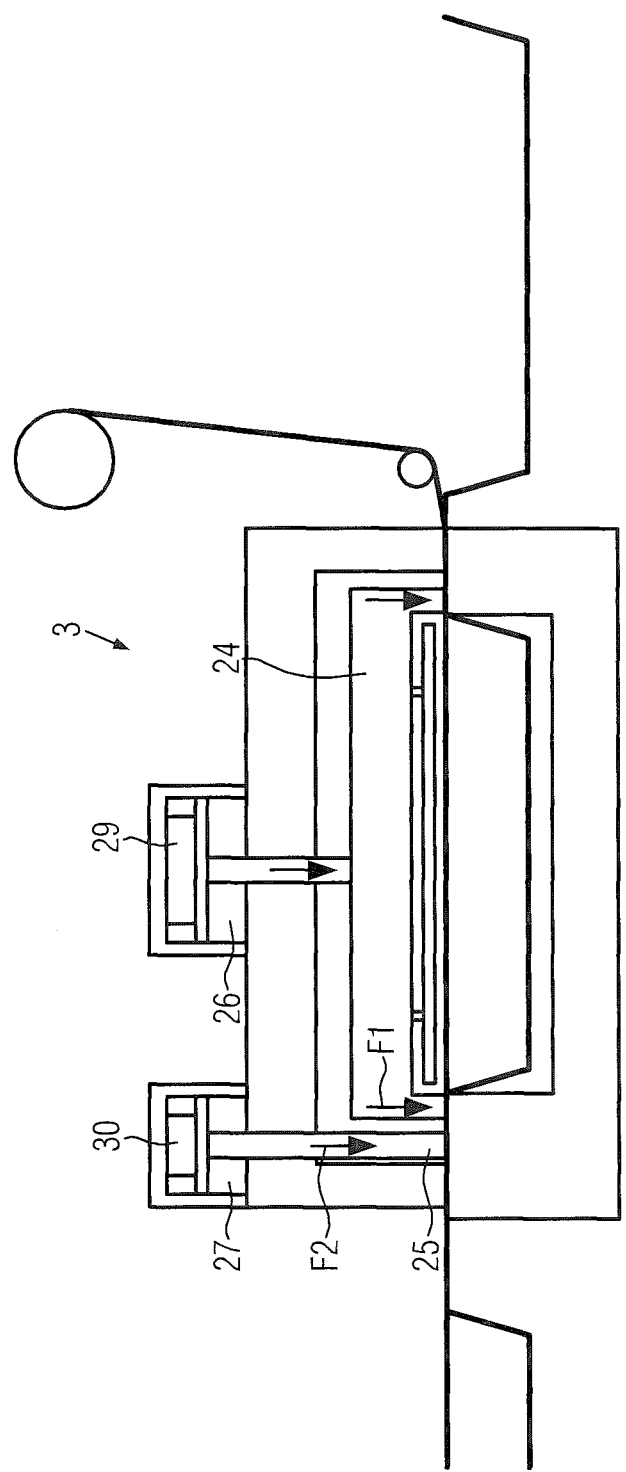
FIG. 4 a schematic sectional side view of the sealing station during the sealing process according to one embodiment of the present invention.

After the evacuation and/or gas-flushing process, the actuators 26, 27 can be, as shown in FIG. 4, activated and move the sealing plates 24, 25 against the films 8, 10 and the sealing tool lower part 22, respectively, and generate a first sealing force F1 for sealing the two films 8, 10 with the first sealing plate 24 and a second sealing force F2 for the purpose of sealing with the second sealing plate 25. The sealing force F1 depends (exclusively) on the first actuator 26 and the sealing force F2 depends (exclusively) on the second actuator 27. The sealing force F1 may be different from the sealing force F2. In the embodiment shown, the forces can be adjusted by means of the pressures in the first diaphragm 28 and the second diaphragm 30. If servo drives are used instead of diaphragms, the sealing force can be adjusted via the torque and the motor current.

Figure 5:
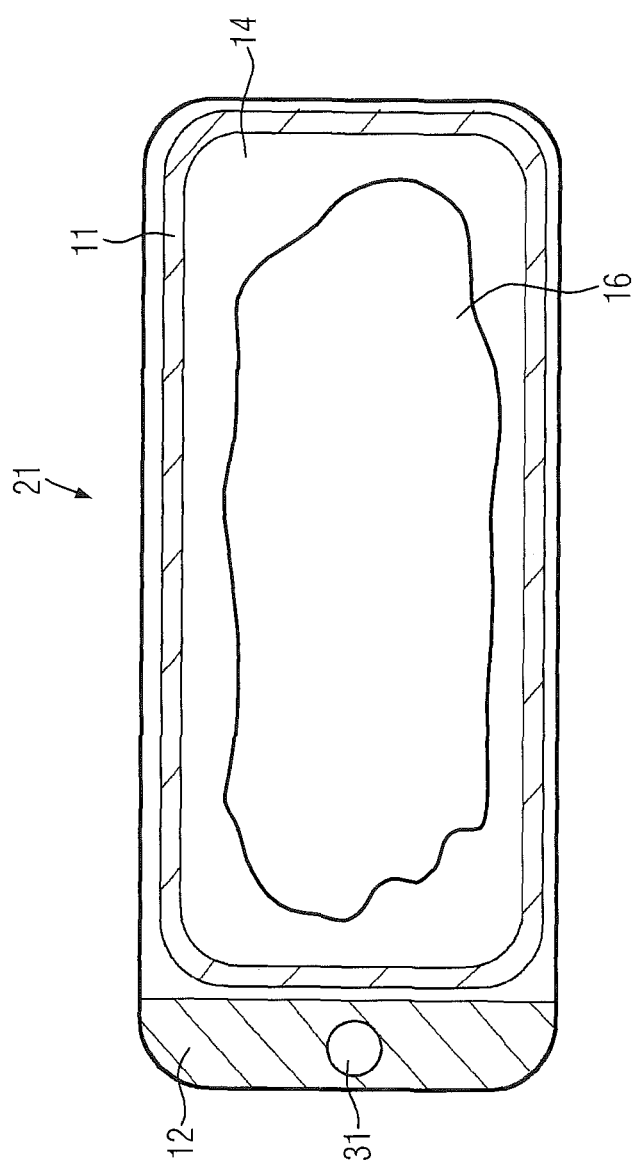
FIG. 5 a top view of a package provided with a sealed seam and a planar seal according to one embodiment of the present invention.

FIG. 5 shows, in a top view of the sealed package 21 produced, a circumferentially extending sealed seam 11, which hermetically seals the trough 14 of the package 21, and a planar seal 12 having formed therein an opening 31 through both films 8, 10, said opening 31 being used for suspending the package 21. The circumferentially extending sealed seam 11 can be produced by means of the first sealing plate 24 with the sealing force F1 provided through the first actuator 26, and the planar seal 12 can be produced by means of the second sealing plate 25 with the second sealing force F2 provided through the second actuator 27. The sealed seam 11 is sealed such that the package 21 can be opened by pulling the cover film 10 off from the film 8, whereas the planar seal 12 can be sealed inseparably.

The division and arrangement of the first 11 and second seal 12 is not limited to the form shown in FIG. 5, other variants are imaginable. The first 24 and the second sealing plate 25 may also be configured such that a plurality of packages 21 can be produced in the sealing station 3 during one sealing process. Likewise, a plurality of actuators for a sealing plate 24, 25 is imaginable. The term "sealing plate" comprises, within the framework of the present invention, also sealing tool parts having a different structural design, such as sealing stamps, sealing rails, sealing bars or the like.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A sealing device for a packaging machine, said sealing device comprising:
   at least a first heat sealing tool for producing a first heat seal disposed circumferentially around a product by separably coupling a lower web and atop web to form a hermetically sealed trough in a package, and a second heat sealing tool for producing a second heat seal on said package by inseparably uniting the lower web and the top web, wherein said second seal is positioned on said package to allow said top web and said lower web to remain united during and after said top web is pulled off said lower web at said first seal to open said hennetically sealed trough of said package;
   a first actuator for moving said first sealing tool and applying a first sealing force of said first sealing tool;
   a second actuator for moving said first sealing tool and applying a second sealing force of said second sealing tool;
   wherein the first and the second sealing forces can be adjusted individually and independently;
   wherein said first sealing tool and said second sealing tool are disposed on a single sealing device; and
   wherein said second sealing tool is disposed outside a perimeter defined by the first sealing tool.

2. A sealing device according to claim 1, wherein the first and second actuators are provided in the form of diaphragms, pneumatic cylinders or motor drives.

3. A sealing device according to claim 1, wherein the packaging machine includes a controller by means of which the sealing force, a sealing temperature and/or a sealing time for the first seal and the second seal can be adjusted separately.

4. A sealing device according to claim 1, wherein the first sealing tool is provided for a plurality of first seals on a plurality of packages.

5. A sealing device according to claim 4, wherein the second sealing tool is provided for a plurality of second seals on a plurality of packages, wherein each package includes at least one first seal and one second seal.

6. A sealing device according to claim 1, wherein the first and the second seal can be produced simultaneously.

7. A sealing device according to claim 1, further comprising a sealing tool upper part and a sealing tool lower part, said sealing tool upper part disposed in an opposing relationship to said sealing tool lower part, wherein said sealing tool upper part and said sealing tool lower part are moveable between an open position and a closed position, and wherein said sealing tool upper part and said sealing tool lower part in said closed position define a chamber, and wherein said first sealing tool and said second sealing tool are disposed within said chamber.

8. A sealing device according to claim 1, wherein said first sealing tool and said second sealing tool are disposed within a chamber defined by a sealing tool upper part and a sealing tool lower part of said sealing device when said sealing tool upper part and said sealing tool lower part are disposed in a closed position.

9. A sealing device according to claim 1, wherein the first sealing force and the second sealing force are different.

* * * * *